(12) United States Patent
Iwasa

(10) Patent No.: US 6,204,977 B1
(45) Date of Patent: Mar. 20, 2001

(54) LENS BARREL

(75) Inventor: Kazuyuki Iwasa, Hino (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/391,748

(22) Filed: Sep. 8, 1999

(30) Foreign Application Priority Data

Sep. 9, 1998 (JP) .................................. 10-255747
Aug. 3, 1999 (JP) .................................. 11-220437

(51) Int. Cl.$^7$ .................................................. G02B 15/14
(52) U.S. Cl. ............................................ 359/700; 359/704
(58) Field of Search .................................. 359/699, 700, 359/701, 703, 704

(56) References Cited

U.S. PATENT DOCUMENTS

| | | | |
|---|---|---|---|
| 5,287,137 | * | 2/1994 | Hara et al. ............... 659/195.12 |
| 6,018,426 | * | 1/2000 | Funuhashi ............... 359/819 |
| 6,115,190 | * | 9/2000 | Harai ............... 359/694 |

FOREIGN PATENT DOCUMENTS 2-89012   3/1990  (JP) .

* cited by examiner

*Primary Examiner*—Ricky Mack
(74) *Attorney, Agent, or Firm*—Ostrolenk, Faber, Gerb & Soffen, LLP

(57) ABSTRACT

A lens barrel has a photographing lens, first and second cam frames, drive systems, respectively driving the first and second cam frames, and a group frame intervening between the drive systems. The advancing and retreating of the second cam are determined by the group frame driven by the first cam frame. When the first cam is moved in the direction of an optical axis of the lens while rotating, the group frame moves rectilinearly along the optical axis with a cam follower engaging with a cam groove. The second cam rotates together with the first cam in the same direction and is largely moved in a slanting direction by the cam follower engaging with the cam groove of the group frame. Thus, the advancing and retreating of a plurality of advanceable and retreatable frame members are increased. Consequently, the local length of the lens barrel is increased.

36 Claims, 10 Drawing Sheets

LENS BARREL

BACKGROUND OF THE INVENTION

1. Field of the Invention

The present invention relates to a lens barrel having a plurality of advanceable and retreatable frame members for supporting photography lenses.

2. Description of the Related Art

In recent years, as zoom lenses have become increasingly longer in focal length, lens barrels have had to accommodate increasing amounts of advancing and retreating of lens groups. A zoom lens barrel proposed under such circumstances and disclosed in the Japanese Unexamined Patent Publication No. 2-89012 is adapted to drive first and second lens group supporting frames for larger amounts of advancing and retreating movements thereof by rotating a drive ring. Further, a first cam groove for moving the first lens group supporting frame back and forth and a second cam groove for moving a drive cam back and forth are provided in the drive ring. The second lens group supporting frame is driven through the drive cam to move back and forth.

However, in the zoom lens barrel disclosed in the Japanese Unexamined Patent Publication No. 2-89012, the first lens group supporting frame is directly driven by the drive ring to move back and forth, while the second lens group supporting frame is driven through the drive cam by the drive ring to move back and forth. Therefore, the advancing and retreating movements of the drive cam are about as much as those of movement of the first lens group supporting frame. Consequently, it is difficult to obtain large amounts of the lens groups. Further, this zoom lens barrel is not necessarily advantageous in the accuracy of the relative position between the first and second lens group supporting frames owing to the presence of the drive cam having a large lift amount.

SUMMARY OF THE INVENTION

The present invention is intended to solve the aforementioned problems. Accordingly, an object of the present invention is to provide a lens barrel which has a plurality of advanceable and retreatable frame members for supporting photographing lenses, is reduced in size, has frame members which have large amounts of advancing and retreating movements and is increased in focal length.

To achieve the foregoing object, according to an aspect of the present invention, there is provided a lens barrel that has a photography lens and comprises a first frame which has a straight groove in parallel with an optical axis of the lens and which also has a first oblique groove inclined with respect to the straight groove. The lens barrel further comprises a second frame which has a first cam-follower engaging with the first oblique groove of the first frame and which also has a second cam-follower. The lens barrel further comprises a third frame, which has a second oblique groove inclined with respect to the optical axis of the lens and engaging with the second cam-follower, and which also has a follower engaging with the straight groove of the first frame. The first frame is operative to transmit a driving force directly to the second and third frames. Thus, the second frame moves rectilinearly and the third frame moves rectilinearly with respect to the second frame.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

Figure 1:
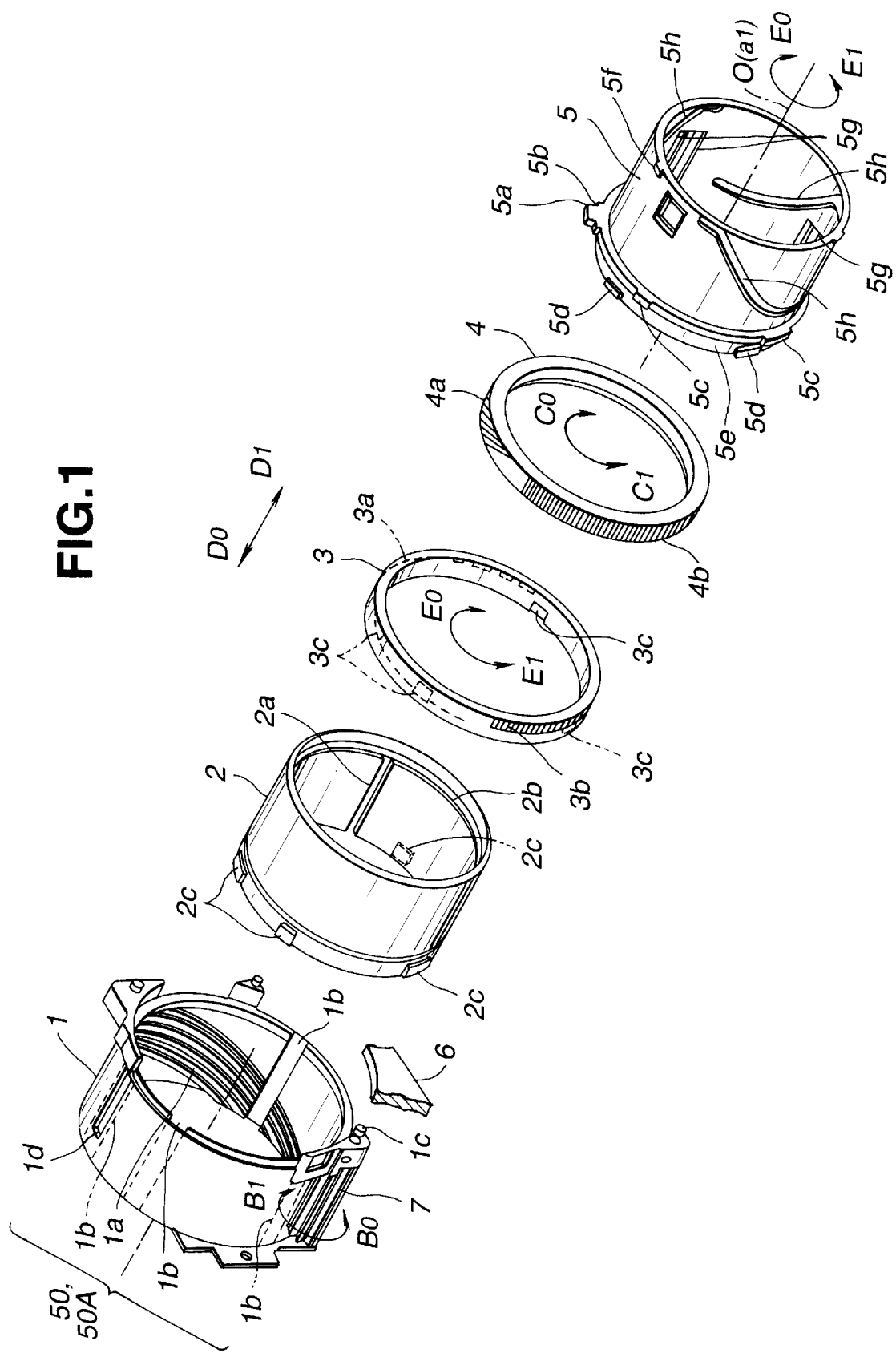
FIG. 1 is an exploded perspective view of a collapsible drive system of a lens barrel, which is an embodiment of the present invention.
Figure 2:
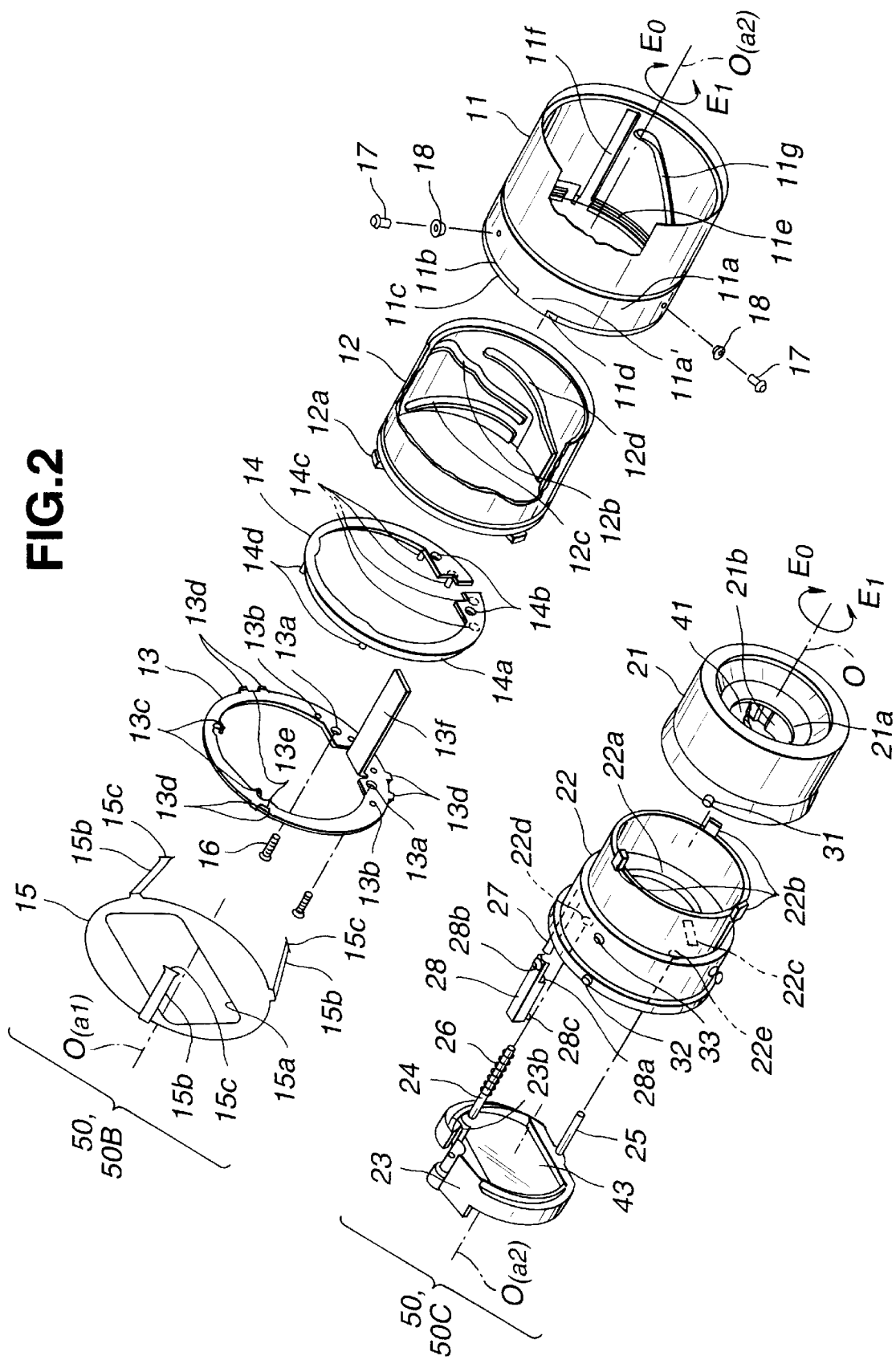
FIG. 2 is an exploded perspective view of a lens group drive system and a lens group frame portion of the lens barrel embodying the present invention.
Figure 3:
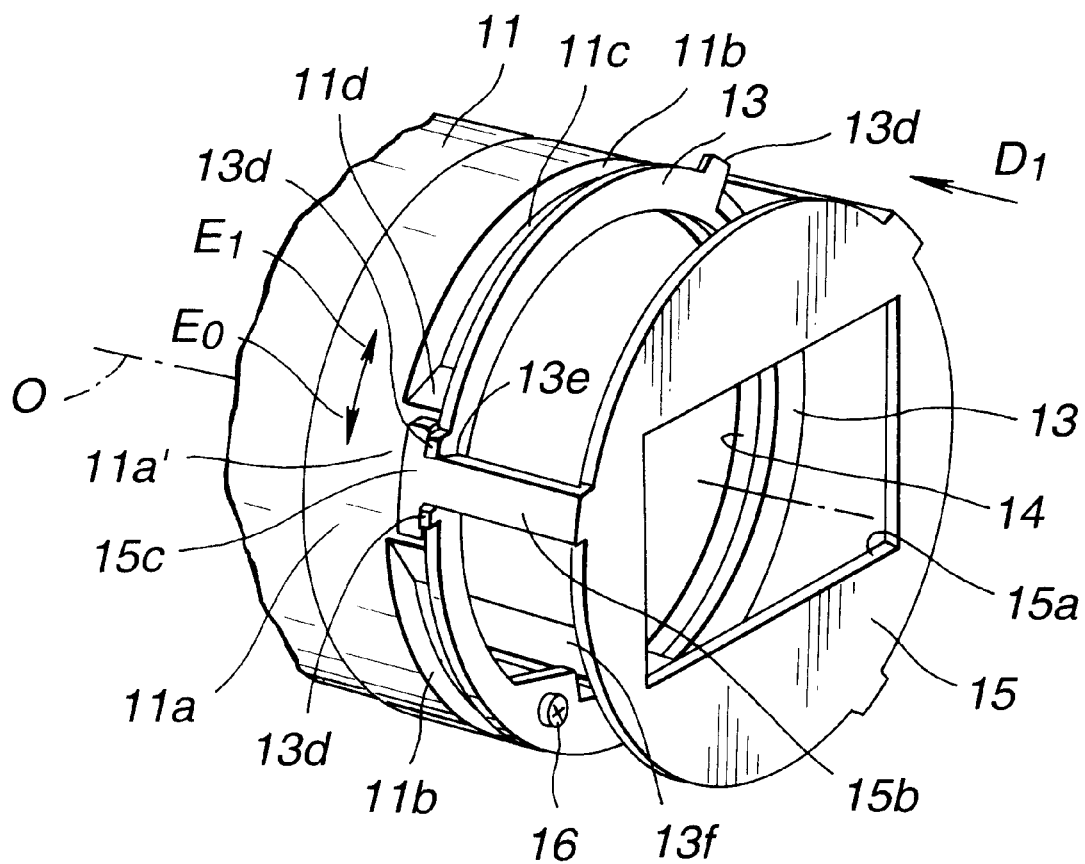
FIG. 3 is a perspective view of a movable flare diaphragm mounting portion of the lens barrel embodying the present invention.
Figure 4:
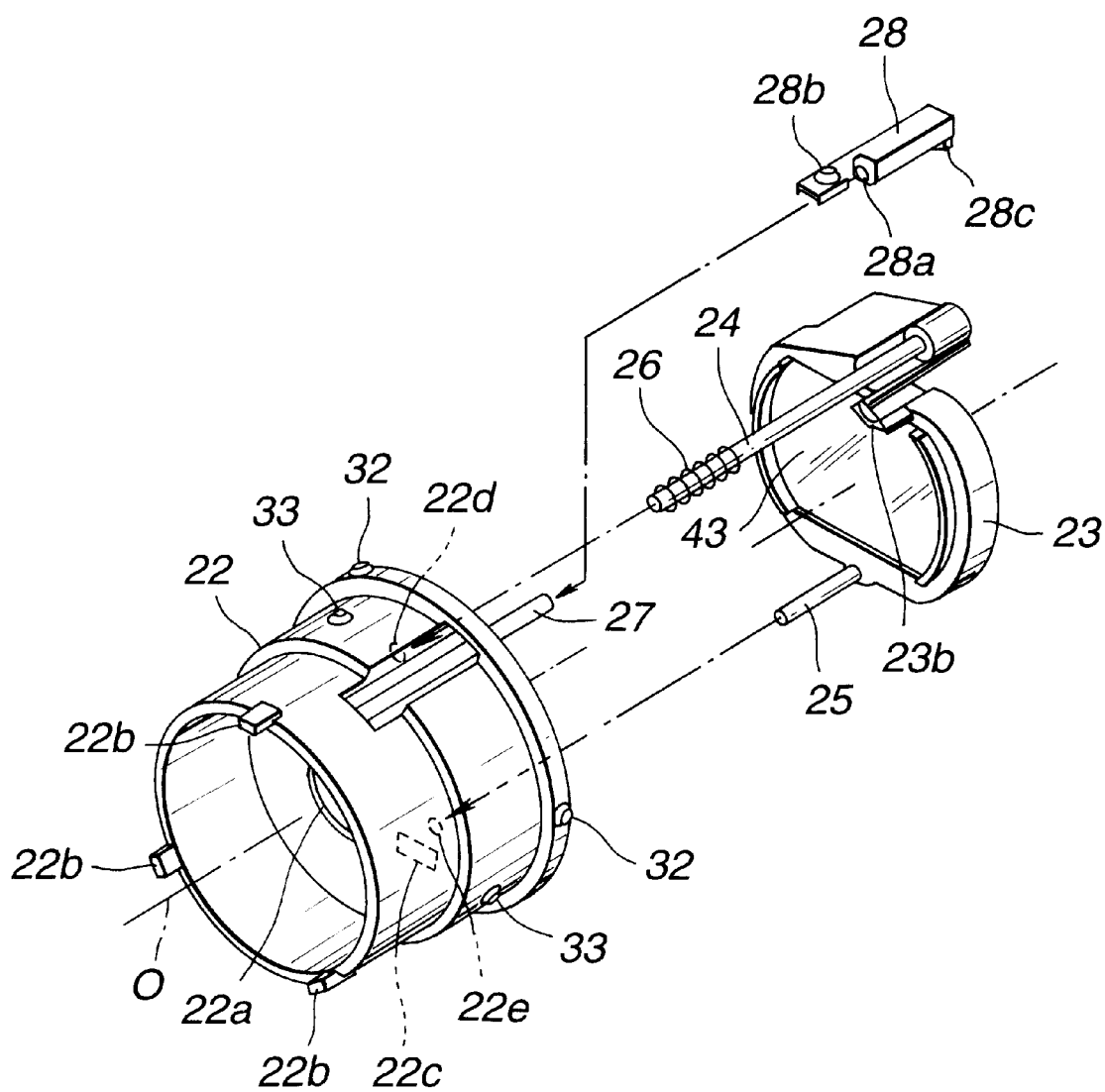
FIG. 4 is an exploded perspective view of second and third group frames of the lens barrel embodying the present invention.
Figure 5:
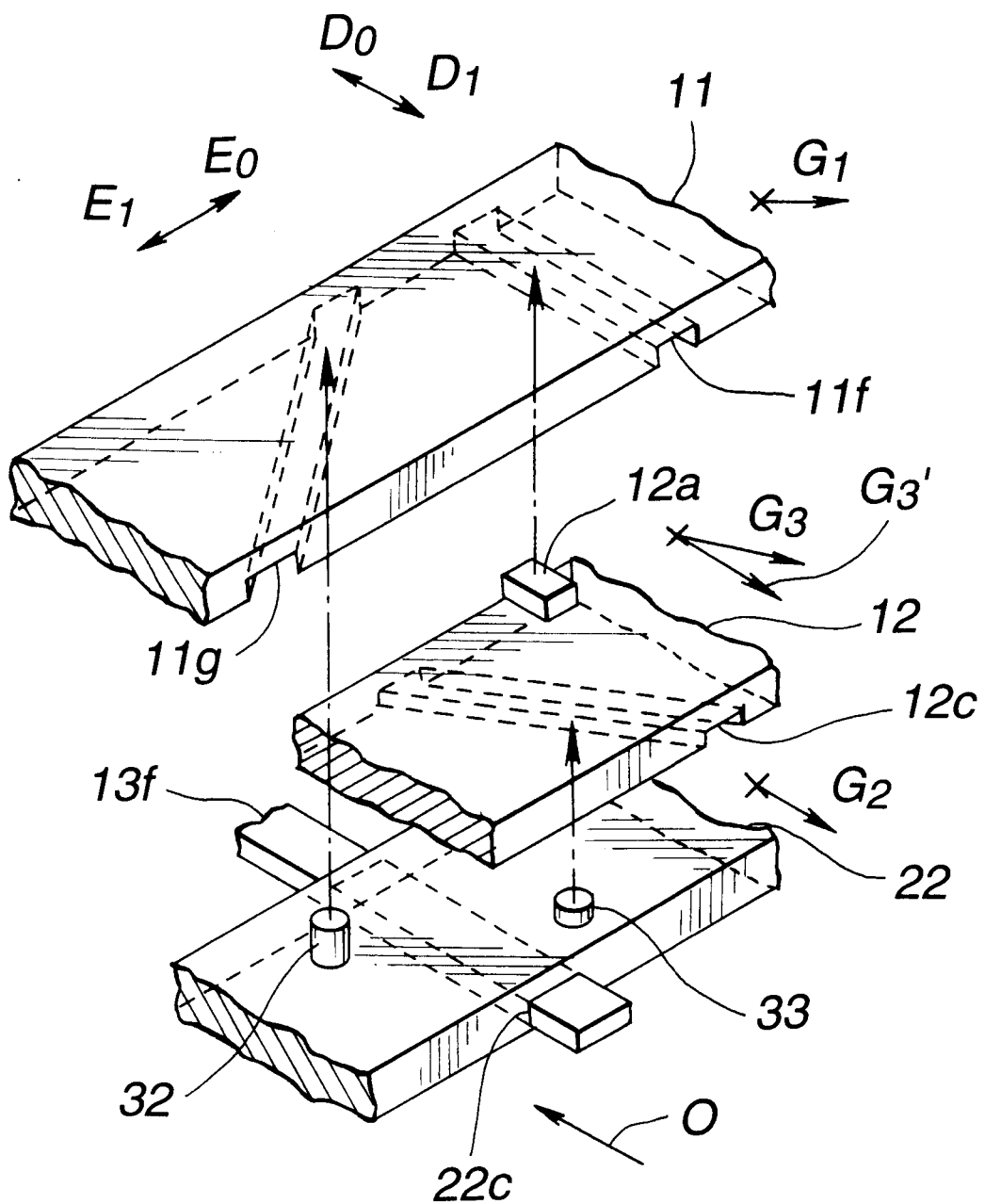
FIG. 5 is a perspective exploded view of the lens group drive system of the lens barrel embodying the present invention.
Figure 6:
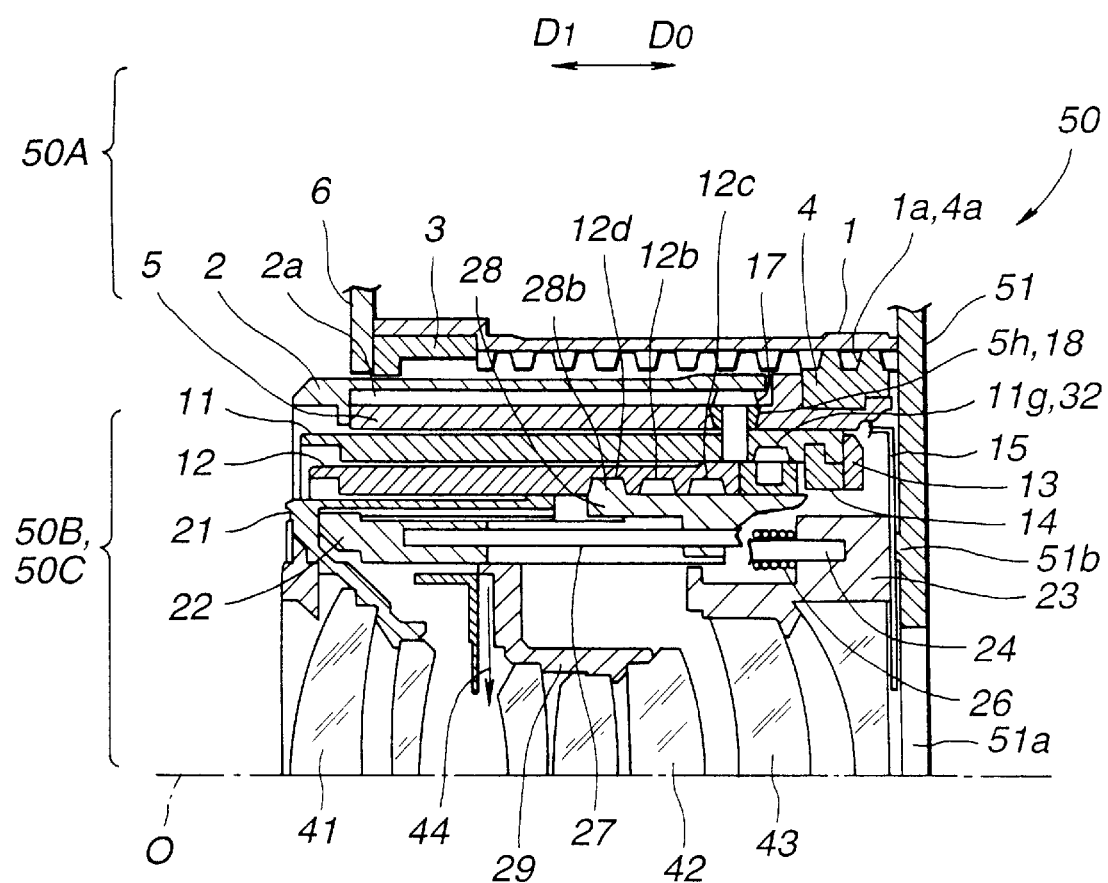
FIG. 6 is a longitudinal sectional view of the lens barrel embodying the present invention in a collapsed state.
Figure 7:
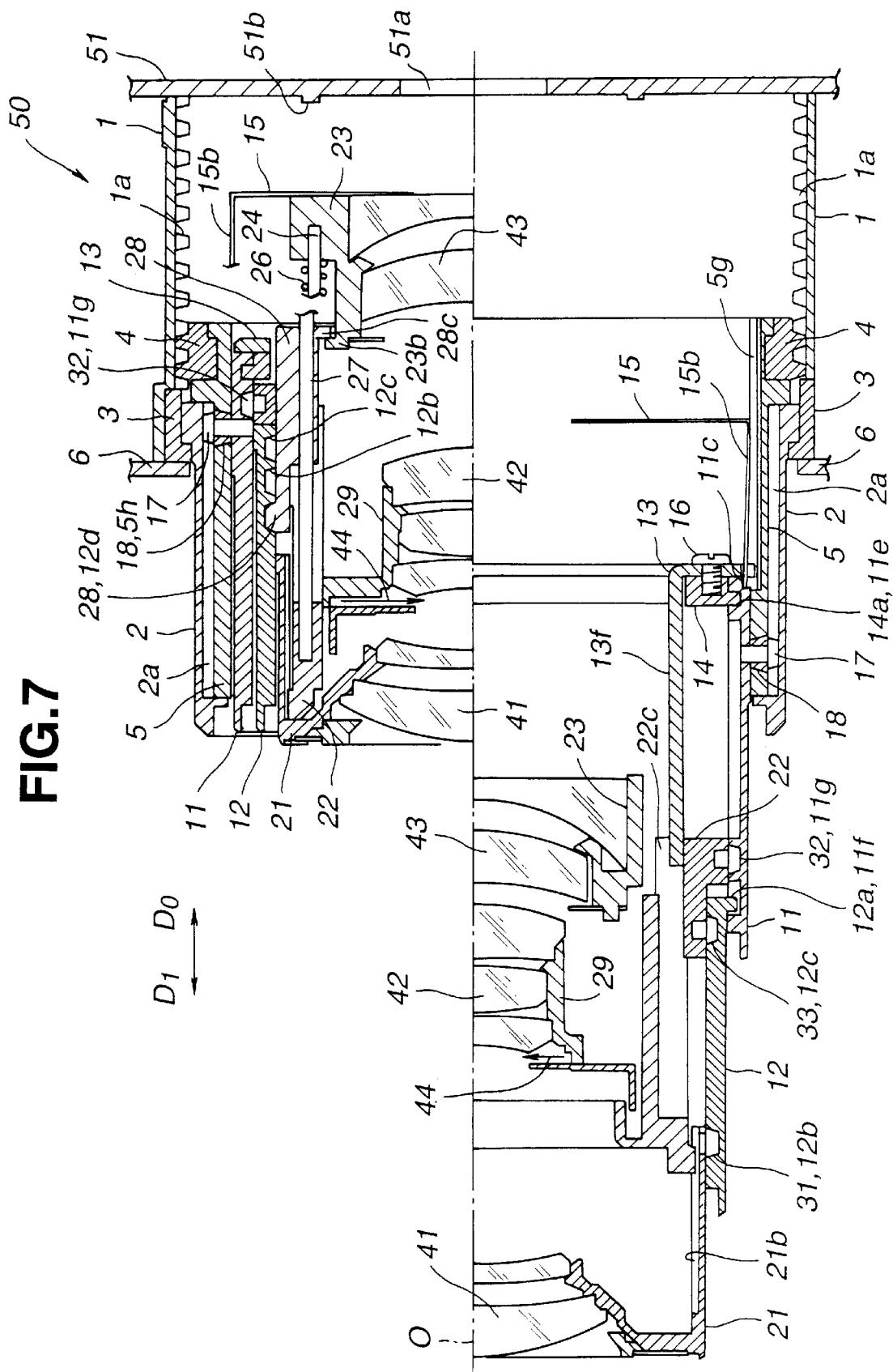
FIG. 7 is a longitudinal sectional view of the lens barrel embodying the present invention, the upper half thereof showing a preparation state and a wide angle state of the lens barrel and the lower half thereof showing a telephoto state.
Figure 8:
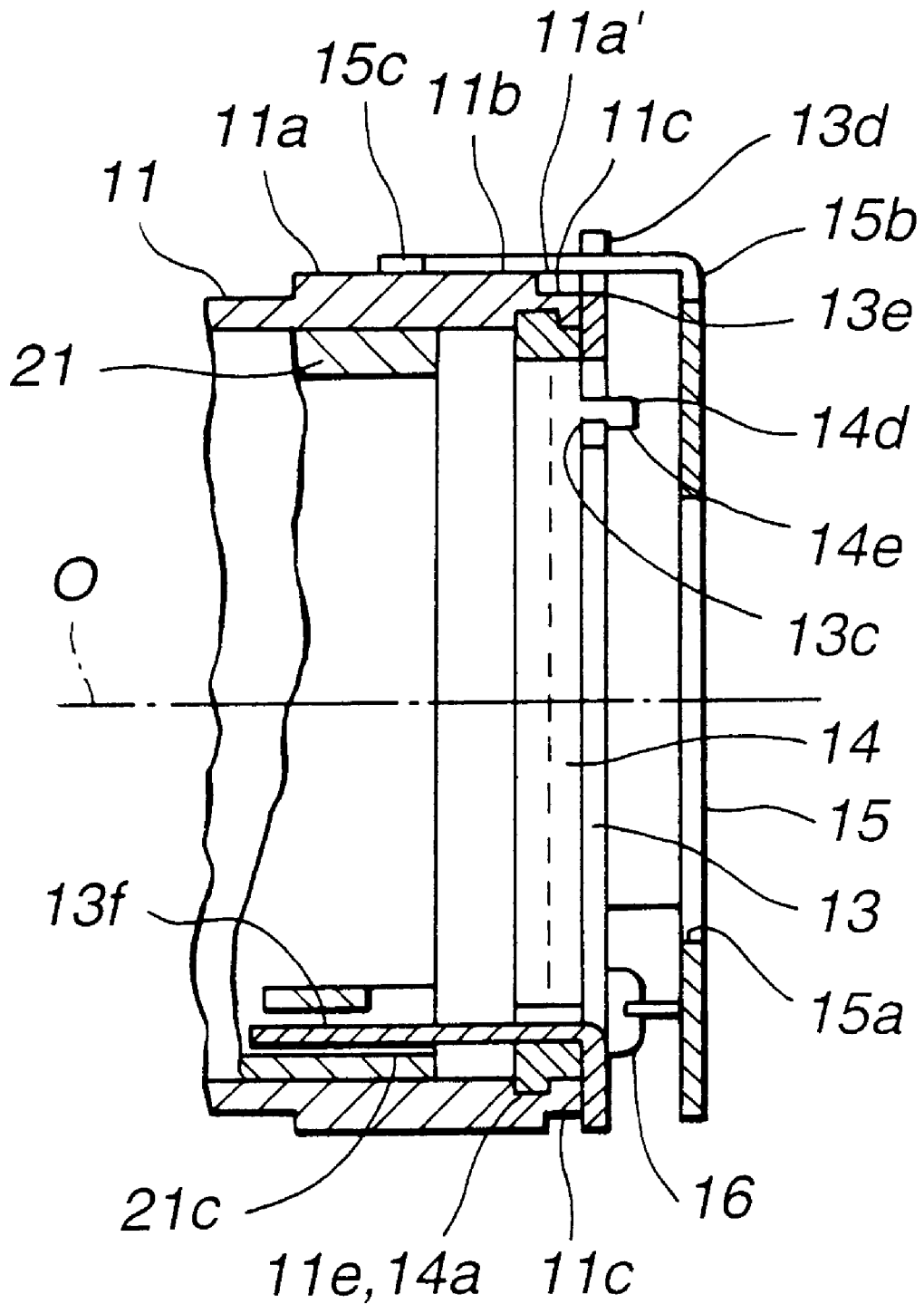
FIG. 8 is a longitudinal sectional view of the movable flare diaphragm mounting portion of the lens barrel embodying the present invention.

FIGS. 1 and 2 are exploded perspective views of a lens barrel 50, which is an embodiment of the present invention. FIG. 3 is a perspective view of a movable flare diaphragm mounting portion. FIG. 4 is an exploded perspective view of second and third group frames. FIG. 5 is an exploded perspective view of a part of a frame member of the lens group drive system. FIGS. 6 and 7 are longitudinal sectional views showing various states of the lens barrel 50. FIG. 6 illustrates a collapsed state of the lens barrel 50. The upper half of FIG. 7 illustrates a photography preparation state and a wide angle state of the lens barrel 50. The lower half of FIG. 7 illustrates a telephoto state of the lens barrel 50. FIG. 8 is a longitudinal sectional view of the movable flare diaphragm mounting portion of the lens barrel 50. FIGS. 1 and 2 are intended to show the shape of each of members of the lens barrel 50, therefore do not exactly show the posture in the direction of rotation of each of the members of the assembled lens barrel 50.

The lens barrel 50 comprises a collapsible drive system 50A for advancing and retracting between the collapsed position and the photography preparation position shown in FIG. 1, namely, in a collapsing driving zone. The lens barrel 50 further comprises a lens drive system 50B for extending each of the lens group portions shown in FIG. 2, and a lens group frame portion 50C.

As shown in FIG. 1, the collapsible drive system 50A comprises a stationary frame 1, which is fixed to and supported by a camera body. The stationary frame 1 has a helicoid drive gear 7 and a drive ring 3. The drive system 50A further comprises a rotary frame 2, which moves between the collapsing position and the photography position and rotates between the wide angle position and the telephoto position at the photography preparation position. The drive system 50A includes a helicoid ring 4, which is rotatably supported on a moving frame 5. The moving frame 5 is adapted to move rectilinearly between the collapsing position and the photography position, together with the rotary frame 2.

Each of the structural members of the collapsible drive system 50A is described in detail hereinbelow. The stationary frame 1 is fixed to the camera body 51 (see FIG. 6) and supported thereon. A straight groove 1d, which receives a projection of the moving frame 5, is provided in the outer circumferential portion of the drive system 50A. A female thread 1a and a straight groove 1b are provided in the inner circumferential portion of the drive system 50A.

A drive ring 3 is attached to a drive ring supporting portion 1c provided at an end part of the system 50A so that the drive ring 3 can be driven to rotate. A wear plate 6 restrains the advancement of the drive ring 3. A helicoid ring drive gear 7, shaped like a long gear, is rotatably supported by the stationary frame 1. A tooth-like part of the gear 7 is exposed to the inner circumferential portion of the stationary frame.

The straight groove 1b and other straight grooves, described later, are provided so as to be in parallel with the optical axis O of a photographing optical system.

A zoom gear 3a, which is driven by engaging with a zoom drive system (not shown), and a finder gear 3b, which is driven by engaging with a finder drive system (not shown), are provided on the outer circumferential portion of the drive ring 3. Notch-like recessed portions 3c are provided in the inner circumferential portion of the drive ring 3.

A straight groove 2a is provided in the inner circumferential portion of the rotary frame 2. An inner circumferential groove 2b is provided in an inner circumferential front end portion of the rotary frame 2. Projections 2c are provided on the outer circumferential portion of the rotary frame 2. A helicoid male thread 4a and a drive gear 4b are provided on the outer circumferential portion of the helicoid ring 4.

A strobe drive projection 5a, straight guide projections 5b and 5c, a projection 5d and a circumferential-direction guide 5e, formed on a ring-like rib between the projections 5b and 5c, are provided on the outer circumferential portion of the moving frame 5. A Projection 5f is provided at an end part of the outer circumferential portion of the frame 5. Three sets of straight double grooves 5g are provided in the inner circumferential portion of the frame 5. Three cam grooves 5h through the outer and inner circumferential portions of the frame 5 and having oblique groove parts are provided therein.

In the collapsible drive system 50A constituted by the aforementioned members, the helicoid ring 4 is received in the circumferential guide 5e of the moving frame 5 and is rotatable, but axially restrained. A lens group drive system 50B and each lens group frame portion 50C are incorporated into the inner circumferential portion of the frame 5 so as to be able to rotate and move back and forth. The moving frame 5 is received in the inner circumferential portion of the rotary frame 2. In this state, the projection 5f engages with the inner circumferential groove 2b. Thus, the frame 5 is rotatably supported on the frame 2, yet the axial position thereof is restrained.

The rotary frame 2 and the moving frame 5 are inserted into the stationary frame 1 by inserting the projections 2c, 5c, and 5b into the straight grooves 1b and 1d so as to be able to move back and forth. The helicoid male thread 4a of the helicoid ring 4 engages with the helicoid female thread 1a of the stationary frame 1. The drive gear 4b engages with the helicoid drive gear 7.

If the helicoid ring drive gear 7 is turned clockwise, as viewed from the object to be photographed in a direction B1, when the moving frame 5 and the rotary frame 2 are at the collapsed position such that the frames 2 and 5 are contained in the stationary frame 1, as shown in FIG. 6, the helicoid ring 4 rotates counterclockwise, in a direction C1. As the ring 4 rotates, the frames 5 and 2 are integrally moved to the photography preparation position, as shown in the upper half of FIG. 7, in a direction D1 toward the object.

When the frames 5 and 2 reach the photography preparation position, the projections 2c of the rotary frame 2 disengage from the straight groove 1b of the stationary frame 1 and received in the recess portions 3c of the drive ring 3. When the drive ring 3 is driven by the zoom drive system to rotate in a direction E0 in such a state, the rotary frame 2 rotates slightly in the same direction and moves from the photography preparation position to the wide angle position. Subsequently, rotating the drive ring 3 in the same direction still more, the frame is driven by the zoom drive system to the telephoto position. The rotary frame 2 is rotated and moved from a zoom position to the photography position by driving the drive ring 3 to rotate in the opposite direction E1. The rotary frame 2 and the moving frame 5 are moved to the collapsed position by driving the helicoid ring drive gear 7 in the opposite direction, namely B0.

Next, the lens group drive system 50B will be described.

As shown in FIGS. 2–4 and 8, the lens group drive system 50B comprises an M-cam frame 11, which is adapted to support mainly a movable flare diaphragm 15. The M-cam frame 11 is connected to the moving frame 5 and driven to move back and forth. The M-cam frame 11 is adapted to rotate together with the rotary frame 2. The drive system 50B further comprises an F-cam frame 12, a third frame rotating together with the M-cam frame 11 and driven through the second group frame 22 to move back and forth. The drive system 50B has a key ring 13, which has a key presser fixed thereto and rectilinearly moves and guides the lens group frame. The drive system 50A has a movable flare diaphragm 15 supported by the M-cam frame 11 and adapted to move rectilinearly.

The members of the lens group drive system 50B will be described hereinbelow in detail.

The M-cam frame 11 is received in the inner circumferential portion of the moving frame 5 so as to be able to rotate and move back and forth. The outer circumferential portion of the M-cam frame is provided with an outer circumferential surface 11a acting as a second sliding surface. An end convex portion 15c of the movable flare diaphragm slides on the outer circumferential surface 11a. The M-cam frame also is provided with three cam followers 17 having stem portions pressed and fixed therein, and three cam followers 18 into which the stem portions of the cam followers 17 are inserted so that the cam followers 18 can rotate. The M-cam frame has a side surface 11b and a circumferential surface 11c of a stepped portion, which act as faces of the stepped portion, an outer circumferential surface 11a' of an end portion having a predetermined width, and an inclined circumferential surface 11d adjoining in the circumferential direction of the surface 11c. Three second group cam grooves 11g, including an inner circumferential groove 11e formed in a film-surface-side end portion, three straight grooves 11f and an inner circumferential groove 11e inclined with respect to the optical axis O are provided in the inner circumferential portion.

The circumferential surface 11c of the stepped portion is formed on the film side end so as to be lower than the outer circumferential surface 11a by one predetermined step level. The surface 11c is a first sliding surface on which an end convex portion 15c of an arm portion of the movable flare diaphragm 15 slides. The width in the axial direction of the circumferential surface 11c of the stepped portion is slightly smaller than the width in the axial direction of the end convex portion 15c so that the end convex portion 15c can slide in the circumferential direction.

The outer circumferential surface 11a' of the end portion is a surface having a radius of curvature equal to that of the outer circumferential surface 11a provided in the circumferential direction of the circumferential surface 11c of the stepped portion. The surface 11a' is a second sliding surface having a predetermined width, on which the end convex portion 15c of the movable flare diaphragm 15 slides.

The circumferential inclined surface 11d continuously connects the circumferential surface 11c of the stepped portion with the outer circumferential surface 11c of the stepped portion with the outer circumferential surface 11a' thereof (see FIG. 3).

The side surface 11b of the stepped portion is a side face which is perpendicular to the axis and provided between the outer circumferential surface 11a and the circumferential surface 11c thereof (see FIG. 3).

The F-cam frame 12 is received in the inner circumference of the M-cam frame 11 so as to be able to move back and forth. Three projections 12a are provided on the outer peripheral portion of the F-cam frame 12. First three cam grooves 12b, which have oblique groove portions inclined with respect to the optical axis O, and second three grooves 12c, which have similar oblique groove portions, and a third cam groove are provided in the inner peripheral portion of the F-cam frame 12.

The movable flare diaphragm 15 is extremely thin and is provided with an opening 15a acting as a central flare diaphragm opening. The movable flare diaphragm has three arm portions 15b, each of which having an elastically deformable portion extending slightly inwardly from a direction parallel to the optical axis in a free state, before assembly with the frame, and has a circumferentially projecting end convex portion 15c. When the lens barrel is assembled, the arm portions 15b elastically deform and the end convex portions 15c are urged by predetermined forces to abut against the outer circumferential portion 11a or the circumferential surface 11c of the M-cam frame 11.

The key ring 13 is a thin, plate-like member for guiding each of the lens group frames rectilinearly and is provided with threaded holes 13a, positioning holes 13b, three double projections 13d provided on the outer circumferential portion, grooves 13e provided between the double projections 13d, two notches 13c and straight keys 13f extending in the direction of the optical axis.

The width of groove 13e allows the arm portion 15b of the movable flare diaphragm to be inserted therein and to be narrower than the circumferential width of the end convex portion 15c. The diameter of the bottom surface of the groove 13e is equal to or less than that of the circumferential surface 11c of the stepped portion of the M-cam frame 11 (see FIGS. 3 and 8).

The key presser 14 is elastically deformable and made by cutting off a part of the ring. The key presser 14 comprises a flange 14a provided along the outer circumference, two threaded holes 14b, positioning pins 14c provided on the side of the threaded holes and adapted to be received in the positioning holes 13b, and two presser pins 14d having claw-like portions 14e.

In the lens group drive system 50B configured by the aforementioned members, first, the F-cam frame 11, in which the projection 12a is received in the straight groove 11f formed in the inner circumferential portion, is inserted into the M-cam frame 11 so as to be able to move back and forth and slide. Furthermore, lens group frames, described later, are incorporated into the inner circumferential portions of the M-cam frame 11 and the F-cam frame 12 so as to be able to move back and forth.

The M-cam frame 11 having lens group frames incorporated therein, is rotatably received in the inner circumferential portion of the moving frame 5 of the collapsible drive system 50A. The cam follower 18 of the M-cam frame is slidably received in a cam groove 5h. The cam follower 17, acting as the stem portion of the cam follower 18 passes through the moving frame 5 and is slidably received in the straight groove 2a of the rotary frame 2. The cam follower 17 is slidably received on the straight groove 2a of the rotary frame 2. Therefore, as the rotary frame 2 rotates, the M-cam frame 11 is driven by the cam groove 5h to move back and forth in the direction of the optical axis.

When the key presser 14 is expanded in the radial direction, the flange 14a is received in an inner circumferential groove 11e of the M-cam frame 11. The key ring 13, positioned by the positioning pin 14c and the positioning hole 13b, is attached to the key presser 14 and fixed thereto by a screw 16. Consequently, the key ring 13, having an axial position restricted to a film-side end portion, is rotatably supported by the M-cam frame 11.

When the key ring is mounted, the presser pin 14d of the key presser 14 is received in the notch 13c, as illustrated in FIG. 8. The engagement portion 14e of the pressing pin 14d engages therewith, so that the key presser 14 and the key ring 13 are held without a gap.

The double projections 13d of the key ring 13 are slidably received in the straight double groove 5g of the moving frame 5, rectilinearly moving back and forth, so that the key ring 13 is driven to move rectilinearly without rotating. The straight key 13f of the key ring 13 is slidably received in the straight guide hole 22c of a second lens group frame 22, described later. Thus, the second group frame 22 and the first group frame 21 and the third group frame 23 supported by the second group frame 22 are guided to move rectilinearly.

The arm portion 15b of the movable flare diaphragm 15 passes through the recess portion 13e of the key ring 13 from the film side. The end convex portion 15c is attached to the outer circumferential surface 11a or the circumferential surface 11c of the stepped portion of the M-cam frame 11.

Next, the lens group frame portion 50C will be described.

The lens group frame portion 50C is constituted by lens group holding frames that are contained in the M-cam frame 11 and the F-cam frame 12 which move rectilinearly. The portion 50C comprises a first group frame 21, which is driven through the Fcam frame 12 and holds a first group lens 41, a second group frame 22, which is guided through the key ring 13 to move rectilinearly, driven by the M-cam frame 11 to move back and forth, a movable follower 28 driven by the F-cam frame 12 to move back and forth, a third group frame 23, which is driven through the movable follower 28 to move back and forth and which holds a third group lens 43, and a focusing frame 29 that is held by the second group frame 22 and driven by the focusing drive system (not shown) to move back and forth and which holds a second group lens 42 (see FIGS. 6 and 7).

In the second group frame 22, three cam followers 32 and three cam followers 33 are provided in the outer peripheral portion. Three projections 22b are provided at an end portion of the frame 22. A straight guide hole 22c, which receives the straight key 13f of the key ring 11, an axial hole 22d extending in the direction of the optical axis O, a notch 22e, a guide shaft 27 fixed and supported in the direction of the optical axis O, and an opening 22a, in which a shutter 44 is mounted, are provided in the inner peripheral portion of the frame 22 (see FIG. 4).

The first group frame 21 holds the first group lens 41 in the opening portion 21a. Three cam followers 31 are provided in the outer circumferential portion of the frame 21. The straight groove 21b is provided in the inner circumferential portion of the frame 21.

The movable follower 28 restrains movement of the third group frame 23. An axial hole 28a, into which the guide shaft 27 of the second group frame 22 is slidably received, a cam follower 28b and an engaging claw 28c, for engaging the three group frame 23, are provided in the movable follower 28.

The third group frame 23 is slidably supported by the second group frame 22 in a direction of the rectilinear movement. The frame 23 is provided with guide shafts 24 and 25 fixed thereto and supported thereon and a portion 23b to be engaged with an engaging claw 28c of the movable follower. The third group lens 43 is held in an opening portion thereof.

The focusing frame 29 holds the second group lens 42 and is supported by the second group frame so as to be able to move back and forth. The frame 29 is driven by the focusing drive system (not shown) to move back and forth (see FIGS. 6 and 7).

In the lens group frame portion 50C constituted by such members, the first group frame 21 is attached to the second group frame 22 with the projection 22b provided on the outer circumference of the object being slidably received into the straight groove 21b of the first group frame 21. The third group frame 23 is attached to the second group frame 22 with the guide shafts 24 and 25 of the third group frame 23 being slidably received into the axial hole 22d and the notch 22e, respectively. A compression spring 26 is received on the guide shaft 24. The third group frame 23 is subjected to a pushing force for pushing the frame 23 toward the film at all times.

The movable follower 28 is attached to the second group frame 22 with the guide shaft 27 being slidably received into the axial hole 28a. When an abutting force of the camera body 51 is not exerted on the third group frame 23, the engaging claw 28c of the movable follower 28 engages with the portion 23b of the third group frame 23, positioning the third group frame 23 appropriately.

The lens group frame portion 50C, which is capable of moving rectilinearly back and forth, is incorporated into the M-cam frame 11 and the F-cam frame 12 of the lens group drive system 50. The straight key 13f of the key ring 13, which is guided to move rectilinearly, is slidably received into the straight guide hole 22c of the second group frame 22. Thus, the first and third group frames 21 and 23 and the movable follower 28 are supported, together with the second group frame 22, so as to be able to move rectilinearly back and forth.

The cam follower 31 of the first group frame 21 is received into the first group cam groove 12b of the F-cam frame 12. The cam followers 32 and 33 are received into the second group cam groove 11g of the M-cam frame 11 and the cam groove 12c of the F-cam frame 12, respectively. The cam follower 28b of the movable follower is received into the third group cam groove 12d of the F-cam frame 12.

Therefore, advancing and retreating of the second group frame 22 of the M-cam frame 11 are determined by the second group cam groove 11g of the M-cam frame 11. The positioning of the F-cam frame 12 is performed by using the second group frame 22 and the second group cam groove 12c of the F-cam frame 12. The movable follower 28 is positioned by the third group cam groove 12d of the F-cam frame 12. The positioning of the third group frame 23 is performed through the engaging portion 28c of the movable follower 28.

Hereinafter, the relative rotation and advancing and retreating between the M-cam frame 11 and the F-cam frame 12 will be described in detail by referring to the exploded perspective view of FIG. 5 showing portion of the M-cam frame, the F-cam frame and the second group frame. The directions E0 and E1 of rotation are perpendicular to the opitcal axis O and the directions D0 and D1 of advancing and retreating are parallel to the optical axis O in FIG. 5, which are the same as the directions E0 and E1 of the rotation and the directions D0 and D1 of advancing and retreating in FIGS. 1 and 2.

As described above, the second group frame 22 intervenes between the drive systems for the M-cam frame 11 and the F-cam frame 12. Thus, the advancing and retreating of the F-cam frame 12 is determined by the second group frame 22 which is driven by the M-cam frame 11 to move back and forth. Also as described above, the projection 12a of the F-cam frame 12 is received into the straight groove 11f of the cam frame 11. The cam follower 33 of the second group frame is received into the cam groove 12c. The cam follower 33 of the second group frame 22 is received into the cam groove 12c such that the straight key 13f of the key ring 13 is guided to move in the direction of the optical axis. Simultaneously, the cam follower 32 is received into the cam groove 11g of the M-cam frame 11.

When the M-cam frame 11 is moved in the direction D1 while the frame M 11 rotates in the direction E0, and then the M-cam frame 11 advances and rotates in the direction G1, the second group frame 22 moves rectilinearly in direction G2 along the optical axis O by utilizing the cam groove 11g and the cam follower 32. The F-cam frame 12 moves by an oblique movement in direction G3 by utilizing the cam follower 33 and the cam groove 12c, while rotating together with the M-cam frame 11 in the direction E0.

The rectilinear movement component G2 of the second group frame 22 is determined according to the movement component G1 of the M-cam frame 11 and to the inclined condition of the cam groove 11g. The rectilinear movement component G3' of the F-cam frame 12 in the direction of the optical axis, which is determined according to the oblique movement component G3 thereof, is obtained by adding the rectilinear movement component G2 of the second group frame 22 to the rectilinear movement component of the inclined cam groove 12c.

Next, collapsing and extending operations of the lens barrel 50 constructed as above described will be described.

When the lens barrel 50 is in a collapsed state, all of the members, such as the rotary frame 2, are held in the stationary frame 1 in the collapsed state, as shown in FIG. 6. The third group frame 23 and the movable flare diaphragm 15 are urged by a projection 51b provided in the vicinity of an aperture 51a of the camera body 51 into a stored position. The end convex portion 15c of the movable flare diaphragm 15 slides on the outer circumferential surface 11a of the M-cam frame 11 forwardly, as shown in FIG. 8.

To drive the lens barrel 50 from the collapsed state to the photography preparation state, the helicoid ring drive gear 7 is rotated in the direction B1 and the helicoid ring 4 is rotated in the direction C1. This rotation of the ring 4 causes the rotary frame 2 and the moving frame 5 to integrally move in the direction D1 while guided by the straight groove 1b. Thus, the frames 2 and 5 are moved from the collapsed position to the photography preparation position (see the upper half of FIG. 7). The moving frame 5 remains engaged with the straight grooves 1a and 1b. The projection 2c of the rotary frame 2 is released from the straight groove 1b and then engages with the concave portion 3c of the drive ring 3. Thus, the rotary frame 2 is placed in a rotatable state.

When the drive ring 3 in the photography preparation state is rotated by a light angle in the direction E0 by the zoom drive system, the lens barrel 50 is brought into the wide angle state, as illustrated in the upper half of FIG. 7.

In the drive process from the collapsed state to the wide angle state through the photography preparation state, the first group frame 21 and the second group frame 22 are extended together with the rotary frame 2 and the moving frame 5. The third group frame 23 is moved backwardly with respect to the M-cam frame 11 and the second group frame 22 and spaced therefrom by the compression spring 26. The engaging claw 28c of the movable follower 28 is moved back with respect to the frames 11 and 23 to the wide position where the claw 28c of the follower 28 engages with the portion 23b of the third group frame 23.

In the drive process, the movable flare diaphragm 15 is pressed by the third group frame 23 backwardly with respect to the M-cam frame 11, and thus, the diaphragm 15 moves backwardly with respect to the frames 11 and 23. The end convex part 15c of the arm portion 15b reaches the outer circumferential surface 11a' of the end portion of the M-cam frame 11 shown in FIG. 3. When the M-cam frame 11 is slightly rotated in the direction E0 to the wide angle position, the portion 15c moves radially inwardly by sliding on the continuously inclined surface 11d and then reaches the circumferential surface 11c of the stepped portion. The movable flare diaphragm 15 thus is placed at a predetermined relative position with respect to the M-cam frame 11 and serves as an ordinary flare diaphragm.

The lens barrel 50 is driven from the wide angle state to the telephoto state by driving the drive ring 3 to rotate in the direction E0, thus rotating the rotary frame 2 in the same direction (see the lower half of FIG. 7). As the rotary frame 2 is rotated in the direction E0, the M-cam frame 11 is rotated and extends along the cam groove 5h of the moving frame 5. The F-cam frame 12 is rotated and moved along the straight groove 11f, together with the M-cam frame 11. The extended position of the F-cam frame 12 is determined by the cam follower 33 of the second group frame 22, which is received in the cam groove 2c.

The second group frame 22, guided by the key ring 13 to perform rectilinear movement, is moved to the telephoto position by the second group cam groove 11g of the M-cam frame 11, in which the cam follower 32 is received. The first group frame 21 is similarly moved to the telephoto position by the first group cam groove 12b of the F-cam frame 12, into which the cam follower 31 is received. The positioning of the movable follower 28 is performed by the third group cam groove 12d of the F-cam frame 12. Then, the third group frame 23 is placed at the telephoto position by the engaging claw 28b of the movable follower 28.

When the M-cam frame 11 is rotated and driven to move back and forth between the wide angle state and the telephoto state, the movable flare diaphragm 15 is held by the groove 13e of the key ring 13 without rotating. The end convex portion 15c slides on the circumferential surface 11c of the stepped portion between the side surface 11b of the stepped portion and the side surface of the groove 13e of the key ring 13. Therefore, the movable flare diaphragm 15 is securely held at a predetermined position spaced from the M-cam frame 11 and thus serves as a normal flare diaphragm.

Next, when the lens barrel 50 is driven from the wide angle state through the photography state to the collapsed state, the drive ring 3 is rotated in the direction E1, so that the lens barrel 40 is in the photography preparation state. The first group frame 21 and the second group frame 22 are received into the moving frame 5. The third group frame 23 is placed at the relative rear position with respect to the M-cam frame 11 (see the upper half of FIG. 7). The M-cam frame 11 is rotated in the direction E1, so that the end convex portion 15c of the arm portion of the movable flare diaphragm 15 slides on the circumferential surface 11c of the stepped portion and the continuously inclined surface 11d and is then placed on the outer circumferential surface 11a' (see FIG. 3).

Thereafter, the helicoid ring drive gear 7 is rotated and driven in the direction B0, so that the helicoid ring 4 is rotated in the direction C0. Then, the rotary frame 2 is moved back in the direction D0, together with the moving frame 5. Thus, the projection 2c of the rotary frame 2 disengages from the drive ring 3. When the rotation of the helicoid ring 4 is continued still more, the rotary frame 2 moves in the direction D0, together with the moving frame 5. Thus, the frames 2 and 5 are placed in the collapsed position in the stationary frame 1 (see FIG. 6).

During the collapsing operation, the third group frame 23 and the movable flare diaphragm 15 are pressed by the projection 51b of the camera body 51 and moves forward against the force of the compression spring 26 to a relative position with respect to the frames 21 an 22. The third group frame 23 is accommodated in the second group frame 22 (see FIG. 6). The movable flare diaphragm 15 moves in the direction of the optical axis to a certain relative position with respect to the M-cam frame 11. The end convex portion 15c of the arm portion slides forwardly on the outer circumferential surface 11a' of the end portion of the M-cam frame 11 into the accommodated state (see FIG. 6).

According to the lens barrel 50 of the present invention as described above, the amount of rectilinear movement in of the F-cam frame 12 is obtained by adding the rectilinear movement component of the second group frame 22 driven through the cam groove 11g of the M-cam frame 11 to the rectilinear movement component thereof caused by the rotation of the M-cam frame and the cam follower 33 of the second group frame 22 and the cam groove 12c of the F-cam frame. Therefore, a large amount of movement of the F-cam frame is realized by a simple drive mechanism. The focal length of the lens barrel is increased, and the size of the lens barrel is reduced.

Figure 9:
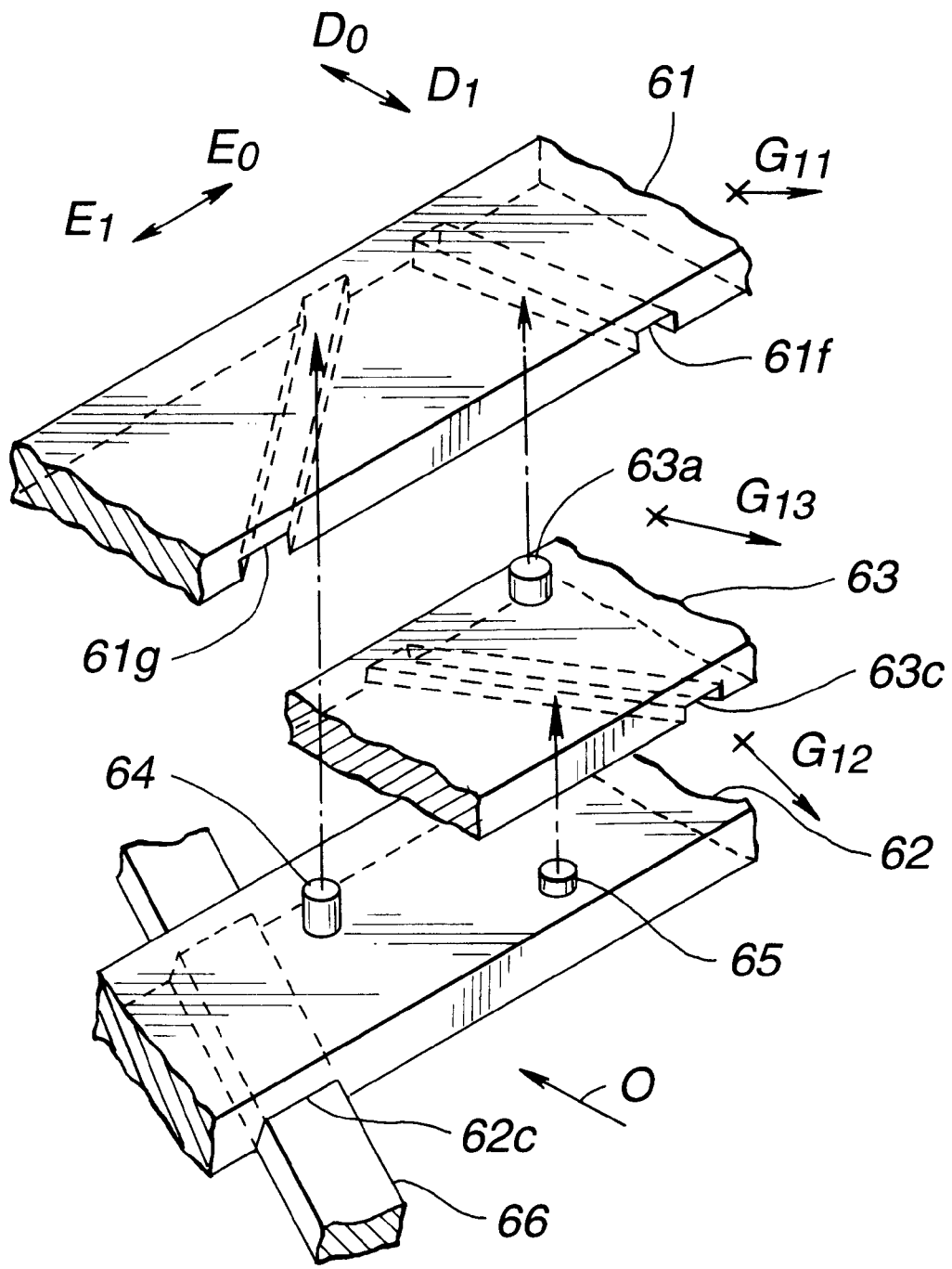
FIG. 9 is an exploded perspective view of a driving force transmission mechanism portion of a modification of a frame member of the lens barrel embodying the present invention.
Figure 10:
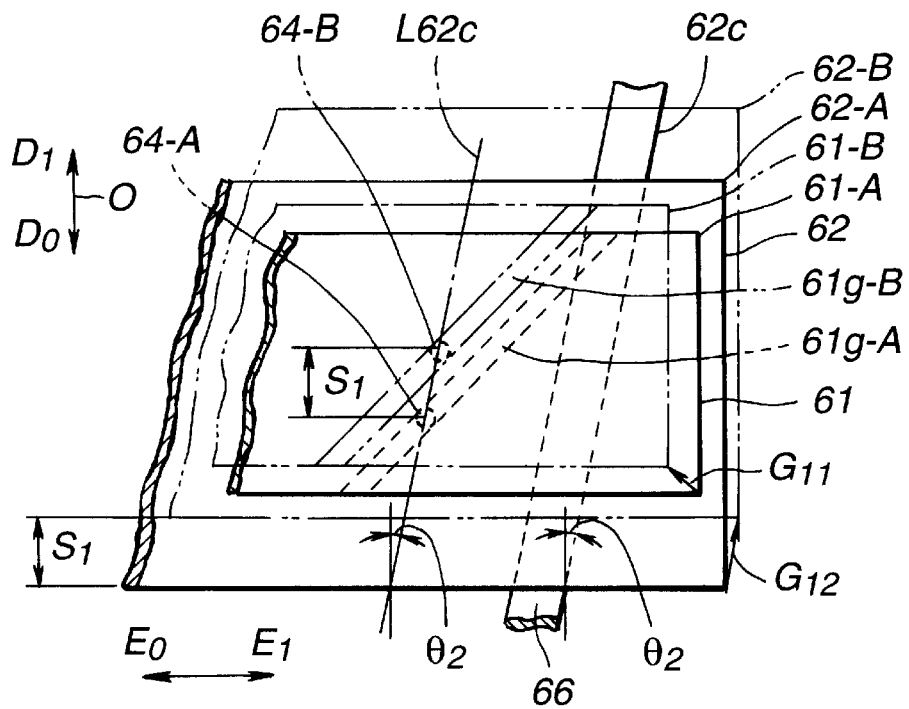
FIG. 10 is a schematic view of an M-cam frame and the second group frame in the frame member of the modification of FIG. 9.
Figure 11:
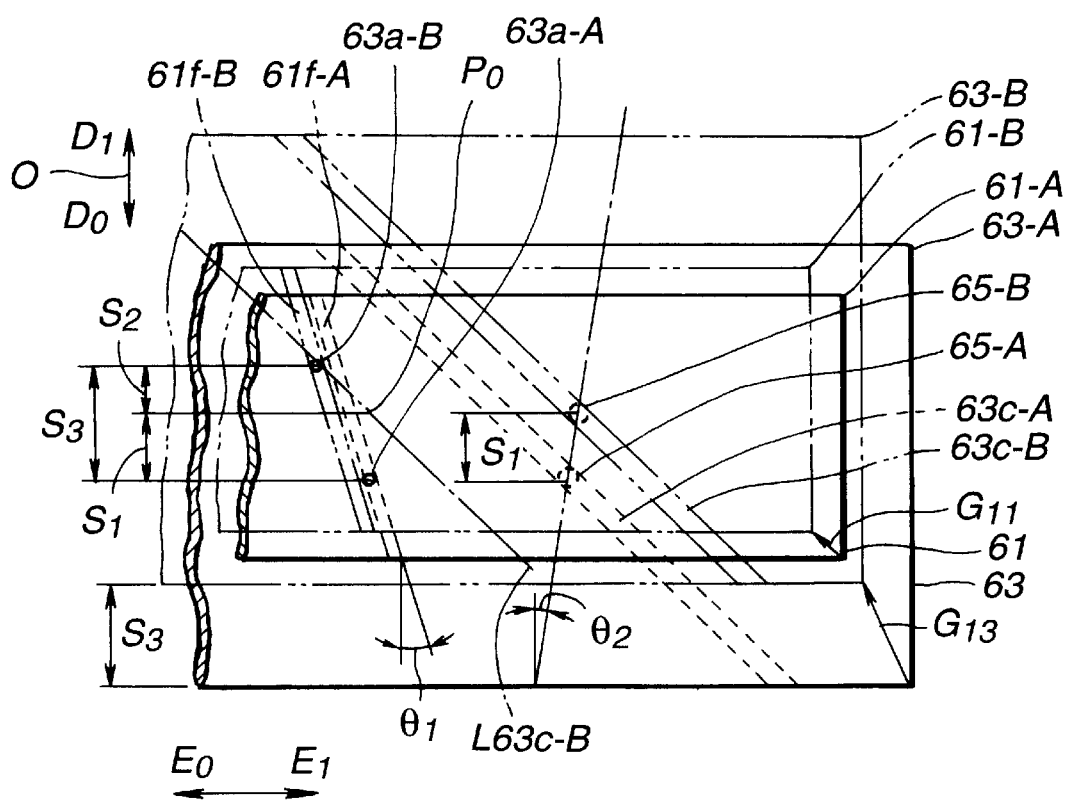
FIG. 11 is a schematic view of the M-cam frame and an F-cam frame of the frame member of the modification of FIG. 9.

Next, a modification of the M-cam frame 11 and the F-cam frame 12 of the lens group drive system 50B in the lens barrel 50 of the aforementioned embodiment, and the second group frame 22 of the lens group frame portion 50C will be described. This modification is different from the aforementioned embodiment in that a direction in which the second group frame is guided is inclined to the optical axis and that a guide groove of the M-frame or guiding the F-cam frame is similarly inclined to the optical axis O. Hereinafter, such differences will be described in detail by referring to the exploded perspective view of FIG. 9, the schematic view of FIG. 10 showing the relative drive state of the M-cam frame and the second group frame, and the schematic view of FIG. 11 illustrating the relative drive state of the M-cam frame and the F-cam frame.

In the inner circumferential portion of the M-cam frame 61 acting as a first frame of this modification, a guide groove 61f, in which a projection 63a of a F-cam frame 63 is slidably received, and a cam groove 61g, into which a cam follower 64 of a second group frame 62 is slidably received, of the first cam means are provided. The rest of the structure of the M-cam frame 61 of this modification is similar to the corresponding structure of the aforementioned embodiment of the present invention.

In the second group frame 62 acting as a second frame of this modification, a guide groove 62c, in which a guide key 66 provided in the key ring 13 is slidably received, and the cam follower 64 slidably received into the cam groove 61g of the cam frame 61 and a cam follower 65 slidably received into a cam groove 63 of the F-cam frame 63 are provided. The rest of the structure of the second group frame 62 of this modification is similar to the corresponding structure of the second group frame 22 of the aforementioned embodiment.

In the F-cam frame 63 acting as a third frame of this modification, a projection 63a of the rotation transmission means slidably received into the guide groove 61f and the cam groove 63c of the second cam means slidably received into the cam follower 65 of the second group frame 62 are provided. The rest of the structure of this modification is similar to that of the corresponding structure of the F-cam frame 12 of the aforementioned embodiment.

As illustrated in FIG. 10, the guide key 66 of the key ring 13 and the guide groove 62c of the second group frame 62 are inclined to the optical axis O of the aforementioned embodiment by an angle θ2. As illustrated in FIG. 11, the guide groove 61f of the M-cam frame 61 is inclined to the optical axis O of the aforementioned embodiment by an angle θ1.

Each of the cam groove 61g of the M-cam frame 61 and the cam groove 63c of the F-cam frame 63 is inclined to the direction of the optical axis O by a constant angle, as illustrated in FIGS. 10 and 11. However, in an actual lens barrel, the cam groove is modified according to lens feeding characteristics. The following operation part corresponds to each of such portions.

Next, advancing and retreating operations of the frame members of this example of modification will be described with reference to FIGS. 10 and 11. The suffices "-A" and "-B" are appended to reference characters in these figures to represent a position of a member before and after such member is driven back and forth, respectively.

When the M-cam frame 61 is moved in the direction D1 while rotating in the direction E0, and is let out in the direction G11, first, the cam groove 61g of the M-cam frame 61 moves from the position 61g-A to the position 61g-B, as illustrated in FIG. 10. During this movement, the cam follower 64 of the second group frame 62 moves from the position 64-A to the position 64-B along a direction L62c, parallel to the guide key 66. Then, the second group frame 62 moves from the position 62-A to the position 62-B in the direction G12. S1 denotes the rectilinear movement component in the direction of the optical axis O.

As the second group frame 62 moves in the direction G12, the cam follower 65 moves from the position 65-A to the position 65-B, as illustrated in FIG. 11. As a result, the cam groove 63c of the F-cam frame 63 moves from the position 63c-A to the position 63c-B.

The guide groove 61f of the M-cam frame 61 moves from the position 61f-A to the position 61f-B. Thus, the projection 63a of the F-cam frame 63, which is received into the guide groove 61f, moves from the position 63a-A to the position 63a-B in a direction L63c-B, parallel to the position 63c-B of the cam groove 63c after the movement thereof.

Consequently, the projection 63a of the F-cam frame 63 moves along G13, which has a rectilinear movement component S3 in the direction of the optical axis O, as shown in FIG. 11. This amount of movement is obtained by adding the rectilinear movement component S1 of the second group frame 62, which moved to the position P0, with the rectilinear movement component S2 in the direction of the optical axis O from the position P0 during the movement of each of the cam groove 63c of the F-cam frame 63 and the guide groove 61f of the M-cam frame 63 and the guide groove 61f of the M-cam frame 61.

According to the lens barrel of this modification, the guide key 66, the guide groove 62c and the guide groove 61f are inclined to the optical axis O. Thus, in comparison with the amount of movement of the M-cam frame 61, the amounts of movement in the direction of the optical axis of the second group frame 62 and the F-cam frame 63 is easily increased.

In this modification, the guide groove 61f of the M-cam frame 61 is shaped like an oblique line. However, a curved-line-like groove may be employed as the guide groove 61f. Each of the guide groove 61f of the M-cam frame 61, which is inclined to the optical axis by the angle θ1, and the guide key 66 of the key ring 13, which is inclined to the optical axis by the angle θ2, may be inclined in a direction opposite to the direction shown in a corresponding one of FIGS. 10 and 11. In the foregoing description, the M-cam frame moves in the direction of the optical axis while rotating. However, the M-cam frame may be adapted to rotate without moving in the direction of the optical axis.

As described above, according to the lens barrel of the present invention, a required amount of movement of the frame is reliably obtained by the cam means of the three frames. Consequently, the reduction in size of the lens barrel is achieved.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A lens barrel having a photographing lens, comprising:
   a first frame having a straight groove, which is parallel to an optical axis of said photographing lens, and a first oblique groove being inclined to said straight groove;

a second frame having a first cam follower, which engages with said first oblique groove of said first frame, and a second cam follower; and a third frame having a second oblique groove, which is inclined to the optical axis of said photographing lens and engages with said second cam follower, and a follower engaging with said straight groove of said first frame;

wherein said first frame directly transmits a driving force, which is generated by rotation thereof, to said second and third frames, thereby causing said second frame to move rectilinearly and causing said third frame to move rectilinearly with respect to said second frame.

2. The lens barrel according to claim 1, wherein said first, second and third frames are cylindrical in form, and wherein said first frame is constructed in such a manner as to be able to contain said second and third frames.

3. The lens barrel according to claim 1, which further comprises straight guide means for guiding said second frame in a direction of the optical axis.

4. The lens barrel according to claim 3, wherein said straight guide means has:

a straight groove provided in said second frame; and a straight guide member slidably received into said straight groove of said second frame.

5. The lens barrel according to claim 4, wherein said straight guide member is enabled to move in the direction of the optical axis and to perform relative movement with respect to said second frame.

6. A lens barrel having a photographing lens, comprising:

a first frame;

a second frame; and a third frame;

wherein said first frame directly transmits a driving force, which is generated by rotation thereof, to said second and third frames, thereby causing said second frame to move rectilinearly, so that said third frame undergoes rectilinear movement thereof, which is caused by said first frame, with respect to rectilinear movement of said second frame.

7. The lens barrel according to claim 6, which further comprises straight guide means for guiding said second frame in a direction of an optical axis of said photographing means.

8. The lens barrel according to claim 6, wherein said first, second and third frames are cylindrical in form, and wherein said first frame is constructed in such a manner as to be able to contain said second and third frames.

9. The lens barrel according to claim 7, wherein said straight guide means has:

a straight groove provided in said second frame; and a straight guide member slidably received into said straight groove of said second frame.

10. The lens barrel according to claim 7, wherein said straight guide member is enabled to move in the direction of the optical axis and to perform relative movement with respect to said second frame.

11. A lens barrel having a photographing lens, comprising:

a first frame;

a second frame;

a third frame;

first cam means provided between said first and second frames;

second cam means provided between said second and third frames; and rotation transmission means provided between said first and second frames;

wherein said third frame is driven in a rectilinear direction by a sum of a first component of movement, which is caused by an action of said first cam means in the rectilinear direction, and a second component of movement, which is caused by an action of said second cam means owing to a rotating operation of said rotation transmission means, in the rectilinear direction.

12. The lens barrel according to claim 11, which further comprises straight guide means for guiding said second frame in a direction of an optical axis of said photographing lens.

13. The lens barrel according to claim 12, wherein said straight guide means has:

a straight groove provided in said second frame; and a straight guide member slidingly received into said straight groove of said second frame.

14. The lens barrel according to claim 12, wherein said straight guide member is enabled to move in the direction of the optical axis and to perform relative movement with respect to said second frame.

15. The lens barrel according to claim 11, wherein said first, second and third frames are cylindrical in form, and wherein said first frame is constructed in such a manner as to be able to contain said second and third frames.

16. A lens barrel having a photographing lens, comprising:

a first frame;

a second frame;

a third frame;

first cam means, provided between said first and second frames, for moving said second frame at least in a direction of an optical axis of said photographing lens;

second cam means, provided between said second and third frames, for moving said third frame at least in the direction of the optical axis; and rotation transmission means, provided between said first and third frames, for moving said second and third frames in the direction of the optical axis with said first cam means owing to rotation of said first frame and then moving said third frame in the direction of the optical axis still more with said second cam means.

17. The lens barrel according to claim 16, wherein said first cam means comprises:

a cam follower; and a cam groove slidably engaging with said cam follower.

18. The lens barrel according to claim 16, wherein said second cam means comprises:

a cam follower; and a cam groove slidably engaging with said cam follower.

19. The lens barrel according to claim 16, wherein said rotation transmission means comprises:

a cam follower; and a linear groove slidably engaging with said cam follower.

20. The lens barrel according to claim 16, wherein said first, second and third frames are cylindrical in form, and wherein said first frame is constructed in such a manner as to be able to contain said second and third frames.

21. The lens barrel according to claim 16, which further comprises:

guide means for guiding said second frame at least in a direction of an optical axis of said photographing lens.

22. The lens barrel according to claim 21, wherein said guide means comprises:

a guide member extending in the direction of the optical axis; and a guided member provided in said second frame and received into said guide member in such a way as to be able to perform relative movement.

23. The lens barrel according to claim 16, wherein said second frame includes a part of said photographing lens.

24. The lens barrel according to claim 23, wherein said second frame includes a focusing frame.

25. A lens barrel having a photographing lens, comprising:

a first frame;

a second frame;

a third frame;

first cam means, provided between said first and second frames, for moving said second frame at least in a direction of an optical axis of said photographing lens;

second cam means, provided between said second and third frames, for moving said third frame at least in the direction of the optical axis; and rotation transmission means, provided between said first and third frames, for moving said third frames in the direction of the optical axis by rotating said first frame and with said second cam means, wherein a force due to movement of said second frame caused by said first cam means in the direction of the optical axis is applied to said third frame.

26. The lens barrel according to claim 25, wherein said first, second and third frames are cylindrical in form, and wherein said first frame is constructed in such a manner as to be able to contain said second and third frames.

27. The lens barrel according to claim 25, which further comprises:

guide means for guiding said second frame at least in a direction of an optical axis of said photographing lens.

28. The lens barrel according to claim 27, wherein said guide means comprises:

a guide member extending in the direction of the optical axis; and a guided member provided in said second frame and received into said guide member in such a way as to be able to perform relative movement.

29. The lens barrel according to claim 25, wherein said first cam means comprises:

a cam follower; and a cam groove slidably engaging with said cam follower.

30. The lens barrel according to claim 25, wherein said second cam means comprises:

a cam follower; and a cam groove slidably engaging with said cam follower.

31. The lens barrel according to claim 25, wherein said rotation transmission means comprises:

a cam follower; and a linear groove slidably engaging with said cam follower.

32. The lens barrel according to claim 25, wherein said second frame includes a part of said photographing lens.

33. The lens barrel according to claim 32, wherein said second frame includes a focusing frame.

34. A lens barrel having first, second and third frames, said lens barrel, wherein said first frame directly transmits a driving force to said second and third frames, and said third frame moves by a sum of an amount of movement caused by said first and second frames and an amount of movement caused by said first and third frames.

35. A lens barrel comprising:

a first frame;

a second frame;

a third frame;

first cam means, provided between said first and second frames, for moving said second frame at least in a direction of an optical axis of a lens;

second cam means, provided between said second and third frames, for moving said third frame at least in the direction of the optical axis; and rotation transmission means, provided between said first and third frames, for moving said second and third frames in the direction of the optical axis with said first cam means owing to rotation of said first frame and then moving said third frame in the direction of the optical axis still more with said second cam means.

36. A lens barrel comprising:

a first frame;

a second frame;

a third frame;

first cam means, provided between said first and second frames, for moving said second frame at least in a direction of an optical axis of a lens;

second cam means, provided between said second and third frames, for moving said third frame at least in the direction of the optical axis; and rotation transmission means, provided between said first and third frames, for moving said third frames in the direction of the optical axis by rotating said first frame and with said second cam means; wherein the movement of said second frame, which is caused by said first cam means, in the direction of the optical axis is applied to said third frame.

* * * * *